US009386160B2

(12) United States Patent
Kruithof

(10) Patent No.: US 9,386,160 B2
(45) Date of Patent: Jul. 5, 2016

(54) CALL SETUP FROM A CIRCUIT SWITCHED NETWORK TO A TERMINAL RESIDING WITHIN A PACKET SWITCHED NETWORK

(75) Inventor: Jacobus Martinus Kruithof, Oosterhout (NL)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1243 days.

(21) Appl. No.: 12/867,955

(22) PCT Filed: Feb. 22, 2008

(86) PCT No.: PCT/EP2008/052197
§ 371 (c)(1),
(2), (4) Date: Aug. 17, 2010

(87) PCT Pub. No.: WO2009/103347
PCT Pub. Date: Aug. 27, 2009

(65) Prior Publication Data
US 2011/0007735 A1   Jan. 13, 2011

(51) Int. Cl.
*H04L 12/66* (2006.01)
*H04M 7/12* (2006.01)
*H04L 29/12* (2006.01)
*H04L 29/06* (2006.01)

(52) U.S. Cl.
CPC ........... *H04M 7/127* (2013.01); *H04L 29/1216* (2013.01); *H04L 61/157* (2013.01); *H04L 65/104* (2013.01); *H04M 7/128* (2013.01)

(58) Field of Classification Search
CPC ..................................................... H04M 7/127
USPC ........ 370/352, 401; 709/227; 455/445, 435.1, 455/422.1
See application file for complete search history.

(56) References Cited

U.S. PATENT DOCUMENTS

| | | | | |
|---|---|---|---|---|
| 8,139,560 | B2 * | 3/2012 | Hynonen et al. | 370/352 |
| 2001/0037392 | A1 * | 11/2001 | Park | 709/227 |
| 2008/0037566 | A1 * | 2/2008 | Rasanen | 370/401 |
| 2008/0039104 | A1 * | 2/2008 | Gu et al. | 455/445 |
| 2008/0056235 | A1 * | 3/2008 | Albina et al. | 370/352 |
| 2008/0200170 | A1 * | 8/2008 | Sun et al. | 455/435.1 |

(Continued)

FOREIGN PATENT DOCUMENTS

| | | | |
|---|---|---|---|
| CN | 1870777 A | * | 11/2006 |
| EP | 1 816 823 A | | 8/2007 |

OTHER PUBLICATIONS

3GPP SA WG2: "Voice Call Continuity between CS and IMS Study (3GPP TR 23.806 version 7.0.0 Release)" 3GPP TR 23.806 V7.0.0, XX, XX Dec. 1, 2005.

*Primary Examiner* — Parth Patel

(57) ABSTRACT

A user with a terminal residing in a Circuit Switched (CS) telecommunication network calls a party having a terminal residing at a Packet Switched (PS) telecommunication network, the CS and PS networks connected to each other by gateway entity. The party to be called at the PS network is addressed by means of a Session Initiation Protocol Universal Resource Identifier (SIP-URI). The call setup is performed in a two step process. In a first step, the terminal sends a the SIP-URI in a message together with the address of this terminal to a network entity which stores said message. In a second step, the terminal calls the network entity, wherein the network entity selects the stored SIP-URI and resolves the SIP-URI into an address of the terminal at the PS network and instructs the gateway entity to connect the calling terminal to the terminal.

11 Claims, 9 Drawing Sheets

(56) References Cited

U.S. PATENT DOCUMENTS

| | | | |
|---|---|---|---|
| 2008/0267171 A1* | 10/2008 | Buckley et al. | 370/352 |
| 2009/0305688 A1* | 12/2009 | Bonnet et al. | 455/422.1 |
| 2011/0310884 A1* | 12/2011 | Arauz-Rosado | 370/352 |

* cited by examiner

CALL SETUP FROM A CIRCUIT SWITCHED NETWORK TO A TERMINAL RESIDING WITHIN A PACKET SWITCHED NETWORK

TECHNICAL FIELD

The presented solution relates to a method for enabling a call setup by a terminal residing in a circuit switched telecommunication network to a terminal residing in a packet switched telecommunication network. The presented solution also relates to a corresponding system and devices.

BACKGROUND

Traditional Circuit Switched (CS) mobile telecommunication networks, such as a Public Land Mobile Network (PLMN) implemented as e.g. a Global System for Mobile communications (GSM) or Universal Mobile Telecommunication System (UMTS) do nowadays co-exist with Voice over Internet Protocol (VoIP) telecommunication networks.

IP telecommunication network technology is generally applied for new telecommunication networks and tends to be additional to, or eventually replacing, the traditional CS telecommunication networks.

However, as it seems not realistic to consider that all the traditional CS telecommunication networks are replaced by the PS telecommunication networks on a short term, e.g. for economical reasons regarding investments, it is expected that during a considerable period of time both CS and IP telecommunication networks will co-exist.

Although CS and IP technology differ considerably from a technical viewpoint, it is regarded as a requirement for telecommunication network operators that both CS and IP type telecommunication networks should co-operate, particularly in cases where a calling party and a called party have terminals that do not belong to the same, either CS or IP, telecommunication network type. IP telecommunication networks are an implementation of Packet Switched (PS) network technology.

Traditional CS telecommunication networks apply for call set-up an addressing technology according to standard E.164 as defined by the Telecommunication standardization sector of the International Telecommunication Union (ITU-T), where each terminal has been allocated a unique string of at most 15 digits. The PS network technology for telecommunication networks applies in general, e.g. for VoIP, an Internet Protocol (IP) address allocated to a terminal. These IP addresses, as an example, may look like 192.45.206.120 for an IP version 4 address format. Apart from different address formats, from technological viewpoint the CS and the PS telecommunication network technologies further differ in that at CS network technology a link is established by a circuit dedicated to a single connection between two endpoints, whereas at the PS network technology a link is established by a packet stream, routed via available connections between the endpoints wherein these connections are possibly shared with other links.

In spite of the differences between the CS and the PS telecommunication network types, prior art has provided methods to set up a connection from a terminal residing in the CS telecommunication network towards an terminal residing in the PS telecommunication network.

An example of such a solution is published patent application, EP 1 111 893 A2 that discloses a method and system where a user of a terminal, residing at a CS telecommunication network, calls a party having a terminal residing in a PS telecommunication network by means of calling an E.164 address allocated to the called terminal. This method with the allocated E.164 address being part of a phone numbering plan is a solution for addressing terminals having internet format addresses, wherein each terminal to be called, residing in a PS telecommunication network needs two addresses, an E.164 address as well as a PS network type address.

One skilled in the art will recognise that use of network resources explicitly arranged for setting up a call from a terminal residing the CS telecommunication network towards a terminal residing in the PS telecommunication network involves an extension of the common telecommunication network with at least another entity maintaining the relation between both addressing formats requiring additional network links and maintenance.

Furthermore telecommunication network operators should arrange for the E.164 phone numbering plan with a range of reserved phone numbers to be allocated to non-CS telecommunication network type terminals. This range out of the total range delimited by 15 digits cannot be used anymore for CS telecommunication network type terminals. The extension of the existing numbering plan based on the E.164 may thus eventually run out of available numbers.

SUMMARY

It is an object to obviate at least some of the above disadvantages and provide an improved method, system and terminal for a call setup by the terminal residing in a Circuit Switched (CS) telecommunication network to a terminal residing in a Packet Switched (PS) telecommunication network.

A method is described for a call setup from first terminal residing in a CS telecommunication network to a second terminal residing in a PS telecommunication network, wherein the CS and PS networks are communicatively connected to each other. This method comprises the following steps:

As a first step a message is expected from a terminal. This message should both comprise the CS network type address of the terminal for later reference as well as the PS network type address of a party to be called. This message is stored at a network entity in a database for later retrieval. The same terminal, as a second step, should then setup a call request to a network gateway control entity that is arranged to retrieve the message stored earlier at the database. This message retrieval is performed by a query to the database, applying the network address of the terminal making the call setup request, which is the network address corresponding to the address, stored at the message for later reference at the previous step. The network gateway control entity takes care for any resolving of the query result of the party to be called into a terminal address of the PS network address type and provides this address to a media gateway entity for connection between the first terminal and a terminal at the PS network.

The method according to the solution as described is based on the insight, as seen from a user's perspective, that a call setup is a two-step process comprising a first step of submitting a message comprising an address of the party to be called to a first network entity that stores this message, and a second step wherein a different or the same network entity is called for the actual call setup, where the latter entity retrieves the message previously stored and applies the address of the party to be called to complete the call setup process by controlling a network gateway entity that connects the CS and PS networks.

A network address mapping entity is described that is arranged for cooperating in performing a call setup by the first terminal to the second terminal, wherein the entity comprises a control unit, a database and an interface unit that is communicatively connected to external connections that are arranged for receiving and transferring messages, and wherein the control unit is arranged to receive via the interface unit a message that comprises an address of the first terminal as well as an address of a party to be called at the second terminal, store this message at the database, receive a query via the interface wherein the address of the first terminal is provided, select the stored message comprising an address corresponding with the address of the first terminal, retrieve the address of the party to be called from the selected stored message, and provide the retrieved address as a result of the query via the interface.

A network gateway control entity is described that is arranged for cooperating in performing a call setup by the first terminal to the second terminal, wherein this entity is arranged for controlling a gate way entity that communicatively connects the CS and PS networks and wherein this network gateway control entity comprises a control unit arranged for performing a query to a database, memory and an interface that is communicatively connected to external connections that are arranged for receiving and transferring messages, and wherein the control unit is arranged to initialize a query to a database for retrieving an address of a party to be called at the second terminal from a stored message at the database, and wherein the stored message comprises an address of the first terminal. The database is located either under supervisory control of the control unit of the network gateway control entity or by another network entity.

A system is described for performing a call set up by the first terminal residing in the CS network to the second terminal residing in the PS network, wherein the CS and the PS networks are communicatively connected to each other and where the system comprises the entities arranged for performing the method steps as listed above.

A CS type terminal is described that comprises a control unit, Input/Output unit that is communicatively connected to the CS network, wherein the units connected to each other and under control of an operating system and executed at the control unit, wherein the control unit is arranged to perform a call setup method having two steps wherein as a first step a message comprising an Universal Resource Identifier address identifier of a party to be called is transmitted to a first network address, subsequently followed by a second step of a call setup request to a second network address, wherein the second step is initialized by the control unit under control of the operating system of the terminal in response to the first step on a time-out of a timer, initialized in response to the first step. The first and second network addresses are predefined identical or different network addresses.

The solution as described provides an advantage in that a called PS network type terminal does not need to have addresses according to both CS and PS addressing formats when called by a party having a terminal residing in the CS network. The party to be called at the IP terminal has to be known by only a single address identifier, such as an PS associated address. Application Initialization and maintenance of a relation between e.g. an E.164 phone number and an IP address is redundant by application of the solution as presented.

A further advantage as provided by the solution is that an expected exponential growth of PS network type terminals does not put any limitation on the availability of the E.164 phone numbering plan for CS network type terminals.

A still further advantage of some embodiments of the solution is that implementation does not require extensive changes or replacements within the telecommunication infrastructure but instead re-uses existing entities and requires only require small adaptations. The traditional CS network still has a huge installed base with investments that need to be returned over a long period requiring a continued use.

A still further advantage of the solution is that a party to be called is addressed by means of a name or string of characters like an electronic mail address, allowing a functional name as address for a party to be called and having the potential to be remembered more easy than a number.

In the following, advantageous examples of the solution are presented with reference to the enclosed drawings in order to give the skilled person a full and complete understanding. However these examples are illustrative and not intended to be limiting.

DETAILED DESCRIPTION

Figure 1:
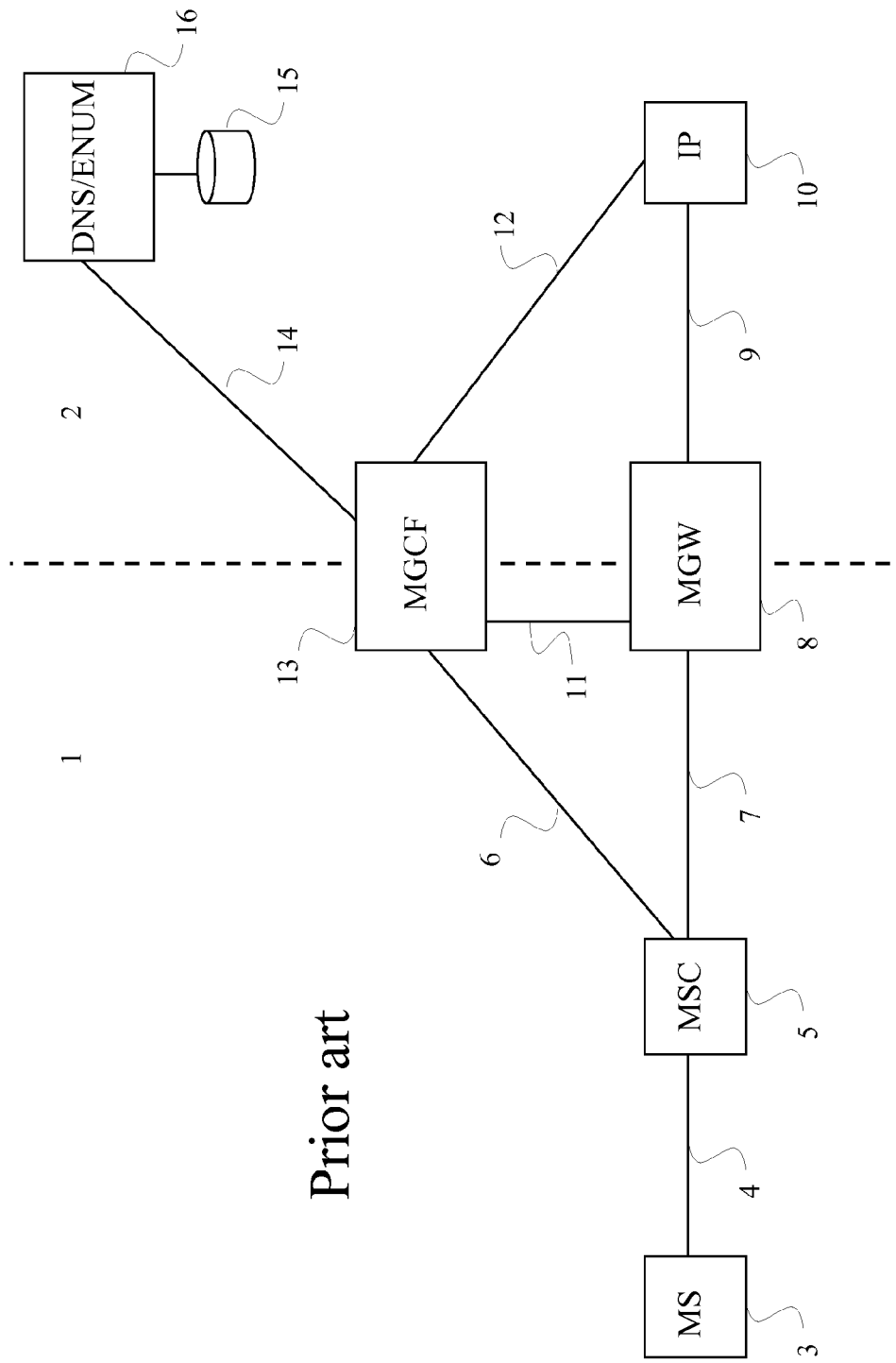
FIG. 1 is a schematic diagram representing a telecommunication network according to the prior art comprising interconnected Circuit switched and Packet Switched networks.

Without restrictions to the scope of the solution, in order to provide a thorough understanding of the presented solution, the solution is presented against the background and within the scope of the current implementation of a Public Land Mobile Network (PLMN) telecommunication network implemented as a Global System for Mobile Communication (GSM) as defined by GSM standards of the International Telecommunication Union (ITU), the European Telecommunication Standard Institute (ETSI) and 3.rd Generation Partnership Project (3GPP). However, the presented solution may be employed in any context of a telecommunication system comprising other mobile access networks such as the Universal Mobile Telecommunications Network (UMTS), where specific entities or nodes and signaling protocols named in the GSM system are replaced by the appropriate protocols and network entities.

In a traditional telecommunication network, such as a Public Switched Telephony Network (PSTN), an Integrated Services Digital Network (ISDN) or the PLMN, a connection between parties is based on addresses of the terminals commonly designated as e.g. a telephone apparatus, a telephone set or a phone. Calling a certain party is enabled by dialing the address of the party, the address commonly denoted as the phone-number of the party.

As to achieve addressing of terminals in the global PSTN, ISDN or PLMN telecommunication networks, the ITU provided an E.164 standard, describing a phone-number format consisting of at most 15 digits, such that a phone is globally addressable.

The PSTN, ISDN and PLMN networks apply a Circuit Switched (CS) technology where for a call a circuit link is reserved between a calling and a called party.

Ongoing developments in telecommunications have provided a method of setting up and establishing a call different from reserving a circuit link for one call, as in CS networks. By sampling voice and transmitting these voice samples packaged in packets, wherein packets generally are provided with a source and destination address and control data, a media connection between a suitable transmitter and a receiver is established. Media is to be regarded as voice, video, data, messages, etc.

At this so called Packet Switched (PS) telecommunication each packet contains one or more samples.

When transmitting these media samples, a carrier frequency for transmission of the packets is selected, and a sampling precision in relation to the sampled media is selected as well, such that the link used for transmitting the samples is only occupied for a part of the time during the duration of a call.

The remaining time might be used by other streams of samples between other sources and destinations, thereby allowing PS telecommunication networks, as opposite to CS networks telecommunication with links reserved for a single call, to establish multiple calls simultaneously over the same link.

State of the art telecommunication via PS networks is mainly applied by means of the Internet, being a PS network type using an Internet Protocol (IP).

This IP protocol further comprises lower protocols such as Universal Datagram Protocol (UDP) or Transfer Connection Protocol (TCP) as developed for computer communications and also a Session Initiation Protocol (SIP) designed for telecommunication operations via the Internet.

Apart from a method of transmitting media by means of a circuit or a packet, CS and PS telecommunication networks do also have different addressing methods. In a CS network the E-164 standard enables all terminals to be addressed globally in a standardized way. In the PS network, such as The internet, a terminal has an IP address, depending of the IP version 4 or 6 having respectively 32 bits or 128 bits available for addressing a destination or source address.

The remainder of this description is directed mostly to IP networks such as the Internet as an implementation of the PS network. The Internet is just an example of the practical application of the invention and shall not be limiting the application of the invention at other types of PS networks, such as e.g. Asynchronous Transfer Mode (ATM) networks.

As a further development, based on a method of sending electronic mail to a party, e.g. in an addressing format of "userABC@hostKLM.domainXYZ", addressing in IP telecommunication networks allow addressing of entities, comprising natural or legal persons or physical entities such as a terminal.

Addressing a person by means of the described electronic mail format is standardized for telecommunication by the Internet Engineering Task Force (IETF) denoted as a Universal Resource Indicator (URI) which in combination with the SIP protocol is denoted as SIP-URI. SIP-URI's may have various formats. Examples are:

"sip:userABC@hostKLM.domainXYZ"

"sip: userABC@hostKLM.domainXYZ?subject=projectX".

Although a person is addressed by a SIP-URI, this person would in any case have to communicate via a terminal. As to transfer packets to the terminal of a person or party to be called for a conversation, the SIP-URI must be translated into an IP address associated with this terminal. In the case of a SIP-URI represented as e.g. "sip:userABC@hostKLM.domainXYZ", translation is applied by consulting a Domain Name Server (DNS) which has a mapping of "domainXYZ" to an IP address of a server for this "domainXYZ", which server is arranged to translate "hostKLM" into an IP address of a server named "hostKLM". Even further DNSs are applicable in case more domain names would be present at the SIP-URI.

The name part "userABC" is translated by server "hostKLM" into an the IP-address of the terminal where "userABC" is associated to.

Connectivity between CS and IP type networks is established by a network entity, denoted as a Media Gate Way (MGW) or telephony gateway which has interfaces and physical links to entities in the CS network and interfaces and physical links as well towards entities in the IP network.

The MGW is specially adapted for switching and converting transport protocols used in CS and IP networks, under control of a Media Gateway Control entity (MGC) or Media Gateway Control Function (MGCF) as a separate entity or integrated within an network control entity such A Telecom Server Platform (TSP).

FIG. 1 illustrates schematically an example of a prior art solution for enabling a call from a CS type terminal 3 residing in CS type telecommunication network 1, towards an IP type terminal 10 residing in an IP type telecommunication network 2. This example describes a GSM PLMN as implementation the CS type telecommunication network 1. The CS type terminal 3 is implemented as a Mobile Station (MS) 3.

The GSM PLMN 1 and IP network 2 are communicatively connected to each other by means of a MGW 8 for the media stream via media links 7 and 9, deploying a transport protocol such as an Real-Time Protocol (RTP) as defined by the Internet Engineering Task Force (IETF), and communicatively connected by means of a network gateway control entity, implemented as a MGCF 13 via signaling links 6 and 12. The dashed line between GSM PLMN 1 and IP network 2 represents a border between both network types.

User ABC that requires to be called at his IP terminal 10 by means of MS 3, has registered himself at a telecommunication network operator that maintains a DNS/tElephone NUmber Mapping (ENUM) network entity 16. The operator subsequently takes care that a SIP-URI is created, e.g. "userABC@hostKLM.domainXYZ" and determines an E.164 format telephone number for user ABC.

The operator stores at database 15 an association between the SIP-URI and the E.164 number for user ABC e.g.:

"userABC@hostKLM.domainXYZ"<->"+87190000"

wherein "+" represents a national country code. User ABC was informed by the operator that he could be called by terminals residing at the CS type networks 1, if 08-7190000 is dialed by subscribers calling from within the same national area.

The MGCF 13 controls the MGW 8 via control link 11 applying a Media Gateway Control Protocol (MGCP). The calling party applies its MS 3 to call a party having an IP terminal 10. Radio link 4 connects MS 3 to a network switching entity 5, implemented as a Mobile Switching Centre (MSC) 5 being part of GSM PLMN 1.

For the ease of explanation, further GSM PLMN 1 network radio interface entities, such as a Base Transceiver Station (BTS), a Base Station Controller (BSC) and Radio Network Controller (RNC), are represented by link 4.

The MSC 5, is communicatively connected to the MGW 8 via media link 7 and to the MGCF 13 via signaling link 6.

In this prior art example a call set up initialized by MS 3 to the IP terminal 10 is received via the MSC 5 by the MGCF 13.

The MSC 5 analyses a Called Party Number (CdPN) as provided by the call set up by MS 3. The MSC 5 analyses the CdPN E.164 format address and internationalizes this CdPN address, e.g. 08-7190000 becomes: 3187190000 for a dutch address as to determine a suitable route for this call, wherein "31" represents a dutch national country code. Routing analysis will in this case determine that the CdPN address belongs to IP terminal 10 and decides that the call should be routed to an entry point of the IP network 2.

An Initial Address Message (IAM) request comprising a Calling Party Number (CgPN) and the CdPN, both in E.164 address format is sent by MSC 5 via signaling link 6 to MGCF 13. The IAM is part of an Integrated Services Digital Network User Part (ISUP) protocol The MGCF 13 also reserves via a control link 11 a channel in the MGW 8 for handling a media connection between GSM PLMN 1 and IP network 2 via media links 7 and 9. Subsequently the MGCF transmits a query request via signaling link 14 to the DNS/ENUM entity 16 for translating or mapping the CdPN E.164 number into a domain name. The request comprises a URI in a SIP INVITE message associated with the CdPN and would in this example take the form: sip:3187190000@operator.

The DNS/ENUM entity 16 searches its database 15 for a matching address of the party to be called and on a match parses back to the MGCF 13 the SIP-URI associated with the called party in the form of e.g. sip: userABC@hostKLM.domainXYZ.

Subsequently the MGCF 13 sends the SIP-URI into the IP network 2 where DNS entities and servers [not shown] according to prior art methods translate the SIP-URI into an IP address of the IP terminal 10.

These DNS entities and servers [not shown] send a SIP-INVITE to the IP terminal 10 using IP terminal's 10 IP address.

On a SIP OK 200 reply message, sent by IP terminal 10 towards to MGCF 13, IP terminal 10 indicates that it is ready to receive a connection.

The MGCF 13 sends an ISUP Protocol Answer Message (ANM) to the MSC 5, and as well instructs MGW 8 to convert and forward any incoming data to the other side of media links 7 and 9. whereby the call is established.

Figure 2:
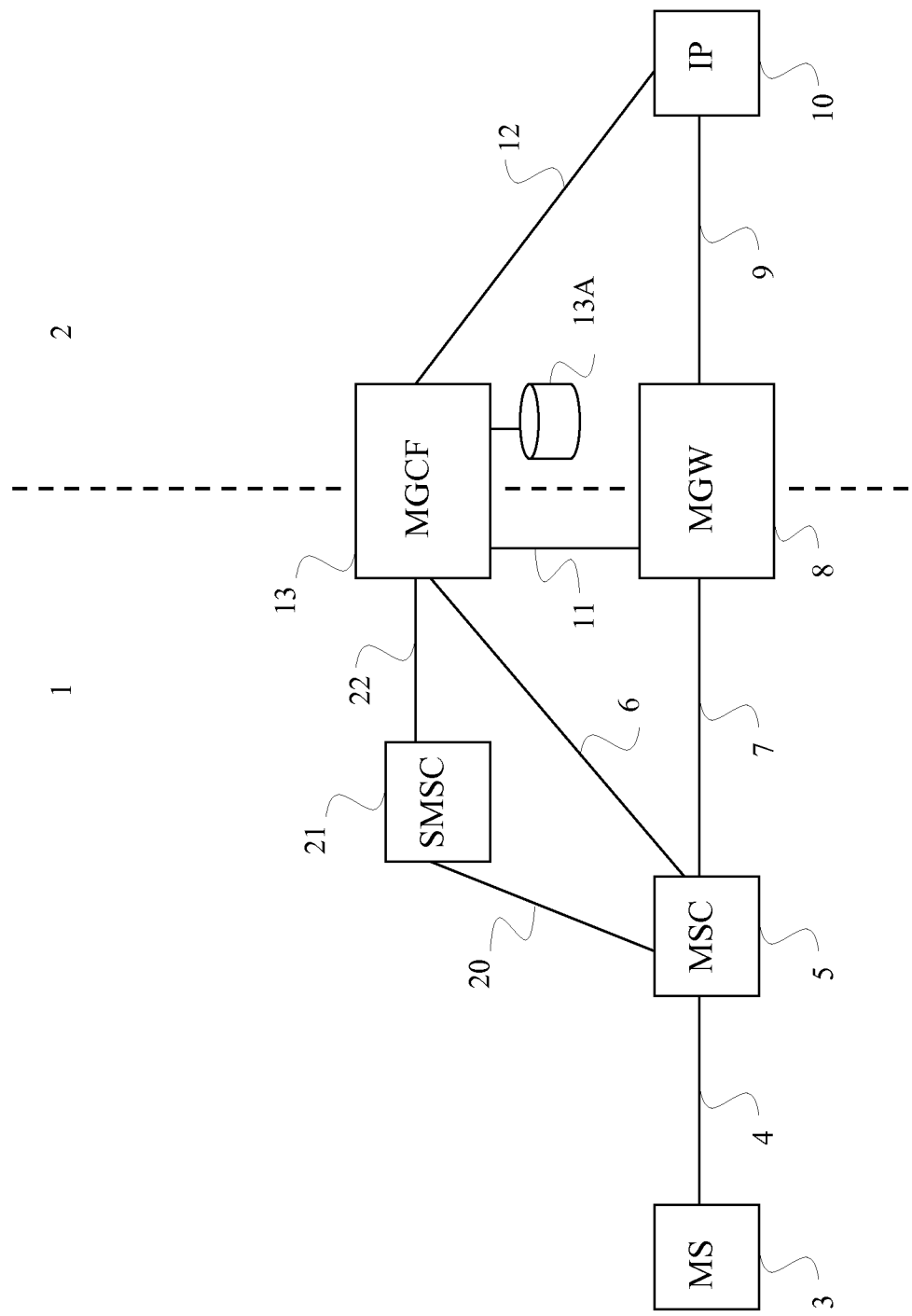
FIG. 2 is a schematic diagram of a configuration of network entities of a first embodiment of the presented solution.

FIG. 2 illustrates schematically a solution according to a first embodiment of the invention, wherein a call from a CS network type terminal 3, is enabled to call a party having a PS network type terminal 2.

This and the following embodiments describe a GSM PLMN 1 as an implementation the CS type telecommunication network 1 and an IP network 2 is described as an implementation of a PS type telecommunication network 2. The remainder of this description lists the CS type terminal in this embodiment implemented as a GSM MS 3 and the PS type terminal respectively as MS 3 and IP terminal 10.

The GSM PLMN 1 and IP network 2 are communicatively connected to each other by means of a network gateway entity 8, implemented as a MGW for the media stream via media links 7 and 9, deploying a transport protocol such as RTP as defined by the IETF, and communicatively connected by means of network gateway control entity implemented as the MGCF 13 via signaling links 6 and 12. Signaling link 6 is arranged for a suitable protocol such as ISUP part of Signaling System #7 (SS7) as defined by the International Telecommunication Union (ITU-T), by the European Telecommunication Standard Institute (ETSI), and by the American National Standards Institute (ANSI).

Signaling link 12 is arranged for a suitable protocol such as SIP as defined by the IETF, or H.323 as defined by the ITU-T.

A dashed line at FIG. 2 between GSM PLMN 1 and IP network 2 represents a border between both network types.

The MGCF 13 controls the MGW 8 via control link 11. Control link 11 is arranged for a suitable protocol such as MGCP or H.248.1 as defined by the IETF and adopted by the ITU-T.

The calling party applies the MS 3 to call a party using an IP terminal 10. Radio link 4 connects MS 3 to a network switching entity 5, implemented as MSC 5 as part of the GSM PLMN 1.

For the ease of explanation, further GSM PLMN 1 network radio interface entities, such as a Base Transceiver Station (BTS), a Base Station Controller (BSC) and Radio Network Controller (RNC), are represented here and in the following embodiments by link 4.

The MSC 5, is communicatively connected to the MGW 8 via media link 7 and to the MGCF 13 via signaling link 6.

A call setup triggered by MS 3 to the IP terminal 10 is received by MGCF 13 via MSC 5.

FIG. 2 further provides a network messaging entity 21, implemented as a Short Message Service Center (SMSC) entity as defined in accordance with 3GPP. SMSC 21 is communicatively connected to MSC 5 via link 20, and via link 22 to the MGCF 13.

A suitable protocol for link 20 is a Mobile Application Part (MAP) protocol as part of the SS7 signaling protocols defined by ITU-T. For link 22, suitable protocols to apply are e.g. Short Message Peer to Peer (SMPP) as defined by The SMS Forum., Universal Computer Protocol (UCP) or MAP protocols The SMSC 21 at this first embodiment is arranged to communicate the contents of a message, sent by MS 3 via MSC 3 towards SMSC 21, together with the CgPN of MS 3, towards MGCF 13 via link 22. The contents of the message is a SIP-URI of a party to be called, and the CgPN represents the address of MS 3 in an E.164 format. The SMSC 21 is arranged to communicate the SIP-URI contents of the message and the CgPN preferably combined as a single message or alternatively as two separate messages towards MGCF 13.

In common telecommunication networks the CgPN is also known as a Calling Line Identification (CLI) identifier, and is generally applied as an address identifier at terminal related protocols and is to be regarded as an address identifier of a calling party's terminal. This CLI comprises the address of the calling terminal expressed in the E.164 format. In this description a CLI is regarded as a synonym for the CgPN.

A condition to communicate the single message comprising the CgPN and the SIP-URI of the called party by the SMSC 21 towards the MGCF 13, is that the destination address of the message sent by MS 3 is a previously determined service number address, such as a GateWay Service Number (GWSNr). At the remainder of this description the term GWSNr is to be understood as an embodiment of a service number address.

This GWSNr is preprogrammed at the MS 3 for sending messages, receives the GWSNr from a network server or should be known to the user of MS 3.

Figure 3:
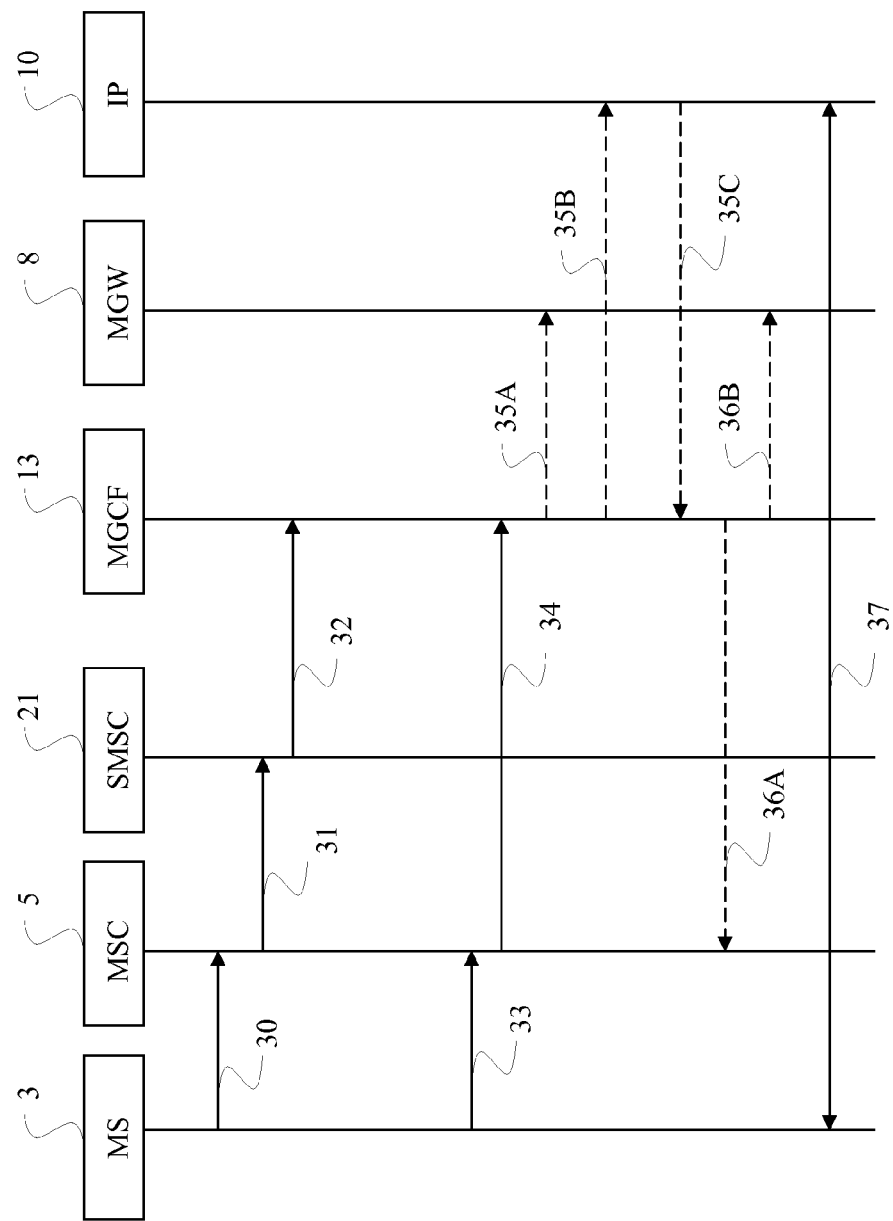
FIG. 3 is a state diagram of the first embodiment of the presented solution.

FIG. 3 illustrates schematically the solution implemented as the first embodiment of the invention, shown at FIG. 2, with a state diagram.

The method according to the present solution is based on the insight, as seen from a user's perspective, that a call towards a party to be called is a two-step process comprising a first step of submitting a message by MS 3 and a second step of initializing a call by the same MS 3.

At the first step of the method the message is sent to a network service entity and comprises an address of the party to be called. The network service entity stores this message for later use.

The second step of the method consists of a call to the same network service entity or a different network entity, wherein the network entity retrieves the message previously stored and applies the address of the party to be called comprised within the message, to complete the call setup process.

MS 3 transmits 30, as the first step of the call setup method, a message comprising the SIP-URI e.g. sip: userABC@hostKLM.domainXYZ of a party to be called as a message e.g. a Short Message Service (SMS), as to call the party at the IP network 2 at its IP terminal 10.

The address used by MS 3 as destination for the message is the GWSNr, preferably previously configured at an address book of MS 3.

The MSC 5 receives 30 the message via radio link 4 and the message contents is forwarded 31 via link 20 towards the SMSC 21. Along with the SMS the CgPN of the MS 3 is sent as well by MSC 5 towards the SMSC 21. SMSC 21 is arranged to recognise that the message received is an attempt of MS 3 to a call setup to the party to be called associated with the SIP-URI as comprised by the message.

The SMSC 21 forwards 32, a message comprising the CgPN identifier of MS 3 and the SIP-URI identifier representing the party to be called at the IP terminal 10 as contents of the message received from the MSC 5, to the MGCF 13 via link 22, and where the MGCF 13 is arranged to store the message in its database 13A. The database 13A is either internal to the MGCF 13 or located elsewhere at a distinct entity or function within a telecommunication platform.

After receiving 32 the message comprising the CgPN identifier of the MS 3 and the SIP-URI identifier of the party to be called at the IP terminal 10, the MGCF 13 stores the message in its database 13A.

This stored message comprises both the CgPN and SIP-URI identifiers associated such that when a subsequent query to the database 12A provides a specific CgPN, the database 13A selects the stored message having the corresponding specific CgPN, and provides the associated SIP-URI of the selected stored message.

As a second step of the call setup method, the MS 3 initializes 33 a call setup request towards the GWSNr. The MSC analyses the CdPN GWSNr as provided by this call setup request. The CdPN E.164 format address is internationalized. Routing analysis will in this case determine that the CdPN GWSNr address belongs to MGCF 13. An IAM request comprising the CgPN of MS 3 and the CdPN GWSNr, both in E.164 address format is sent 34 by MSC 5 via signaling link 6 to MGCF 13.

The MGCF 13 is arranged such that when a call setup request signaling 34 triggered by MS 3 is received, this call setup is regarded as a request that the MS 3 requests to call a party at the IP network 2, the party being represented by the SIP-URI comprised by the message sent 32 by the same MS 3.

On reception of call setup request signaling 34 sent by MSC 5 comprising the CgPN of MS 3, the MGCF 13 reserves 35A via control link 11 a channel in the MGW 8 for handling a media connection between GSM PLMN 1 and IP network 2 via media links 7 and 9.

The MGCF 13 also initializes a process wherein the database 13A is queried for the SIP-URI comprised by the stored message comprising the CgPN corresponding with the CgPN received by call signaling 34 from the MSC 5. Correspondence between the stored CgPN and the received CgPN is directed to at least a significant part of the numbers that allow a reliable comparison.

The MGCF 13 selects at its database 13A the stored message corresponding with the received 34 CgPN and provides as a result of the query the associated SIP-URI of the party to be called comprised by this selected stored message.

Subsequently the MGCF 13 sends 35B the SIP-URI, provided by database 13a, comprised by a SIP-INVITE message to a proxy server, for delivery to IP-terminal 10.

Alternatively the MGCF 13 translates a domain address of the SIP-URI into an IP address with the help of a DNS [not shown]. The MGCF subsequently sends 35B a SIP-INVITE message with the SIP-URI to this IP address for delivery to the IP terminal 10.

The SIP-INVITE message preferably as well comprises the IP address of the MGW 8 interface as to communicate via media link 9 when the call setup is established.

After receiving 35C a SIP OK 200 reply message, representing a positive acknowledgement for receiving a connection, from the IP terminal 10 towards MGCF 13, the MGCF 13 sends 36A an ISUP ANM message to the MSC 5 via signaling link 6, and the MGCF 13 as well instructs 36B MGW 8 to convert and forward any incoming data to the other side of media links 7 and 9, using the previously reserved 35A channel. The MSC 5 switches the MS 3 to the MGW 8 via media link 7 whereby the call is established 37.

At the method as presented, the MGCF 13 only starts the preparations 35A, 35B for a call setup at the IP network 2, after it has received the call signaling 34. As to speed up a call setup these preparations 35A and 35B as an alternative, are performed already as the MGCF 13 received the message 32 from the SMSC 21.

According to this first embodiment the MS 3 transmits 30 the SIP-URI as a text string in an SMS message to the SMSC 21, and initializes 33 a subsequent call setup request to a GWSNr. Deploying the solution in this way, would not require any adaptation to the MS 3, and hence any state of the art terminal 3 with SMS capability would be able to cooperate with the solution without modification.

It is however regarded as useful to adapt the MS 3 to an even more convenient device in that the SIP-URI of the party to be called is selected from a local phonebook of the MS 3 where an operating system (OS) of the MS 3 is arranged to cooperate with the solution as stated below.

The address book of MS 3 is filled with usual phone numbers such as sequences comprising: "person X [name]" followed by "+31651200168 [phone number]" and as well with SIP-URIs "sip:userABC@hostKLM.domainXYZ".

Additionally a function key on the MS 3 enables the keying in of a string of characters including signs and "@", such that when the "Enter" key [or "Yes" or any other key representing off-hook] is pressed as to intialize 33 a call setup request, the keyed-in string of characters, is considered as a destination address.

A selection of an E.164 CS type phone number from the address book or a keyed in string, is handled in the usual way in that the MSC 5 signals that a call setup request is required, but if a SIP-URI is selected from the address book or keyed in as a string of characters, the OS initialises a transmit action of a SMS comprising the SIP-URI. The SMS comprising the SIP-URI is transmitted 30 to a predetermined GWSNr.

A further feature, labeled here as "undetermined sequence" feature, is that a specific sequence of transmitting 30 the message and initialize 33 the call setup request is not necessarily determined. It could occur that when a call setup request signaling originated by MS 3 at the initializing action 33 is received 34 at the MGCF 13, the message, originated by MS 3 at the transmitting action 30, has not yet been received 32 by MGCF 13. Hence a query to the database 13A does not yield any stored association for the CgPN of MS 3. If a telecommunication network operator enables this "undetermined sequence" feature, one or more attempts are scheduled, until a predetermined number of attempts. In case the message from MS 3 is received at MGCF 13 and its contents is subsequently stored as described above in database 13A, a subsequent query would yield a SIP-URI and the call setup method towards IP terminal 10 continues.

A further feature to be optionally implemented at the MS 3 is to arrange the OS of the MS 3 such that when the SIP-URI is transmitted 30 via radio link 4 to MSC 5 towards SMSC 21, that the OS after a predetermined period after transmitting 30 the SMS with the SIP-URI, initializes 33 a call setup request to the predefined GWSNr without user intervention. The predetermined period is adjustable between a few milliseconds until 30 seconds, a value depending on network and terminal performance should be chosen. As a starting value 2 seconds is suggested. In this way a call setup is advantageously performed by the user only having to initialize a message. In case the telecommunication network operator enabled the "undetermined sequence" feature as described above, there is no need to wait for a period between transmitting 30 the message and initializing 33 the call setup request.

Associations of CgPNs and SIP-URIs of parties to be called are retained for a certain period at the database 13A as to efficiently maintain storage facilities. The stored associations also comprise additional data, such as a timestamp, type of address for charging purposes.

Figure 4:
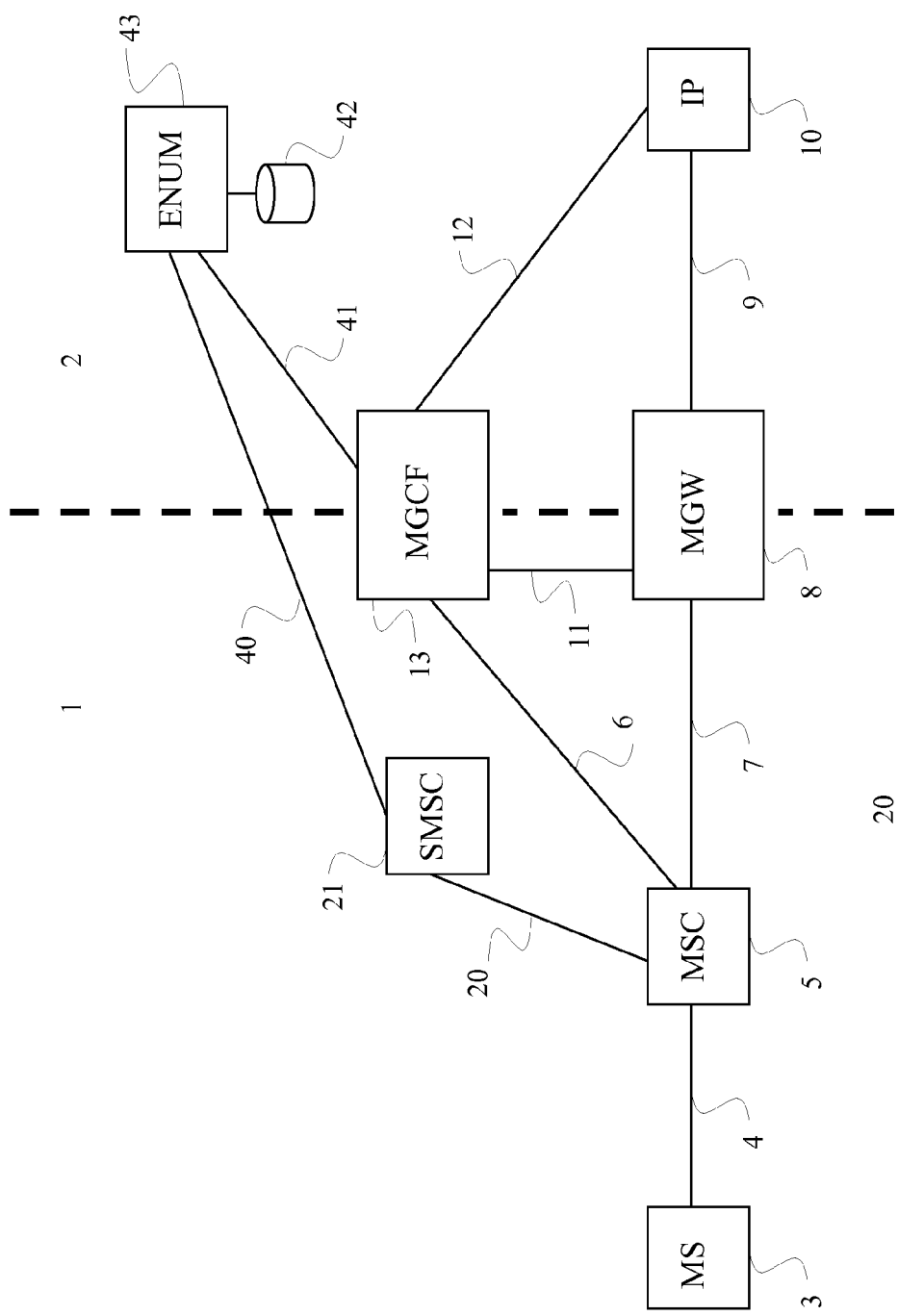
FIG. 4 is a schematic diagram of a configuration of network entities of a second and third embodiment of the presented solution.

FIG. 4 illustrates schematically a configuration of network entities according to a second and third embodiment of the invention wherein a call from a CS network type terminal 3 is enabled to call a party at having a PS network type terminal 10. The configuration of these embodiments is implemented as GSM PLMN 1 and IP network 2 as examples of the CS network and the PS network respectively. The remainder of this description list the CS network type terminal as MS 3 and the PS network type terminal as IP terminal 10.

The GSM PLMN 1 and IP network 2 are communicatively connected to each other by means of a network gateway entity 8, implemented as MGW for the media stream via media links 7 and 9, deploying a transport protocol such as RTP, and communicatively connected by means of network gateway control entity implemented as the MGCF 13 via signaling links 6 and 12. Signaling link 6 is arranged for a suitable protocol such as ISUP part of SS7. Signaling link 12 is arranged for a suitable protocol such as SIP or H.323.

A dashed line at FIG. 2 between GSM PLMN 1 and IP network 2 represents the border between both network types.

The MGCF 13 controls the MGW 8 via control link 11. Control link 11 is arranged for a suitable protocol such as MGCP or H.248.1.

The calling party applies the MS 3 to call a party using an IP terminal 10. Radio link 4 connects MS 3 to a network switching entity 5, implemented as MSC 5 as part of the GSM PLMN 1.

The MSC 5, is communicatively connected to the MGW 8 via media link 7 and to the MGCF 13 via signaling link 6.

A call setup initialized by MS 3 to the IP terminal 10 is received by MGCF 13 via MSC 5.

The solution described at the configuration of the embodiments is enabled by a the use of a network messaging entity 21, implemented as a SMSC entity, in combination with a network address mapping entity 43 implemented as an adapted ENUM server. The SMSC 21 is communicatively connected to MSC 5 via link 20. A suitable protocol for link 20 is a MAP protocol as part of the SS7 signaling protocols.

The adapted ENUM server 43 comprises a database 42, and is communicatively connected towards SMSC 21 via link 40, and towards MGCF 13 via link 41.

For link 40, suitable protocols to apply are e.g. SMPP or UCP or MAP protocols.

The adapted ENUM server 43 is an IP oriented device, related to DNS technology and resides at the IP network 2. Referring to FIG. 1, the prior art DNS/ENUM server 16 comprises a database 15, comprising associations between E.164 phone number identifiers and URI's, such as:

"+316512001067" versus "userABC@hostKLM.domainXYZ". The prior art DNS/ENUM server 16 is typically equipped for cooperating in queries from network entities which provide one of the identifiers of e.g a PS network type and query the DNS/ENUM server 16 for the associated CS network type identifier or vice versa. The identifiers are stored and maintained into the prior art DNS/ENUM server 16 and its database 15, independently of any subsequent query The configuration of the embodiments deploys however an adapted ENUM server 43 with properties different from the prior art DNS/ENUM server 16.

Generally a Short time between loading and retrieval and become void if a subsequent query for them is not executed Referring to FIG. 4, the adapted ENUM server 43 is arranged to receive via link 40 a message comprising a CgPN identifier and a SIP-URI identifier from the SMSC 21, where this message is stored in database 42.

The CgPN identifier represents the address of the MS 3 and the SIP-URI identifier represents the address of the called party to be called at the IP terminal 10.

The MGCF 13 is arranged to query the adapted ENUM server 43 via link 41, where the MGCF 13 provides as an identifier a CgPN, and requiring a response with the associated SIP-URI identifier, comprised by the message having a corresponding CgPN, the message previously stored at the database 42.

Comparing prior art DNS/ENUM server 16 and its database 15, against adapted ENUM server 43 and its database 42, difference are noted.

The messages, stored at the prior art DNS/ENUM server 16 and database 15, comprise the CdPN identifier and the URI identifier and represent a translation of two type of addresses for the same party to be called, whereas at the adapted ENUM server 43 and its database 42 the CgPN identifier and the URI identifier represent a temporary call setup relation between a calling and a called party.

A further difference is the dynamic behavior of the associations. The prior art DNS/ENUM server 16 and database 15 comprise generally stable long lasting associations that are maintained as long as a subscriber is addressable by his unique SIP-URI. As a person deploys his SIP-URI as an address that can only serve addressing purposes if it exists for a considerable time, this prior art DNS/ENUM server/database 16, 15 comprises said associations preferably for more than days. The database 42 of adapted ENUM server 43 according to the invention however comprises dynamic short term associations that only do have a meaning during a call setup process, hence a very short period compared to the prior art DNS/ENUM server/database 16, 15.

At the configuration of the embodiments the SMSC 21 provides adapted ENUM server 43 with a composed message comprising the CgPN identifier and the SIP-URI identifier, where the SIP-URI is received in a message via MSC 5 via links 4 and 20 from MS 3. The composed message sent by the SMSC 21 via link 40 is sent according to one of the SMPP, UCP or MAP protocols.

A retrieval of the SIP-URI of the party to be called by the MGCF 13 is performed by means of a query initialized by the MGCF 13 towards adapted ENUM server 43 via link 41.

Figure 5:
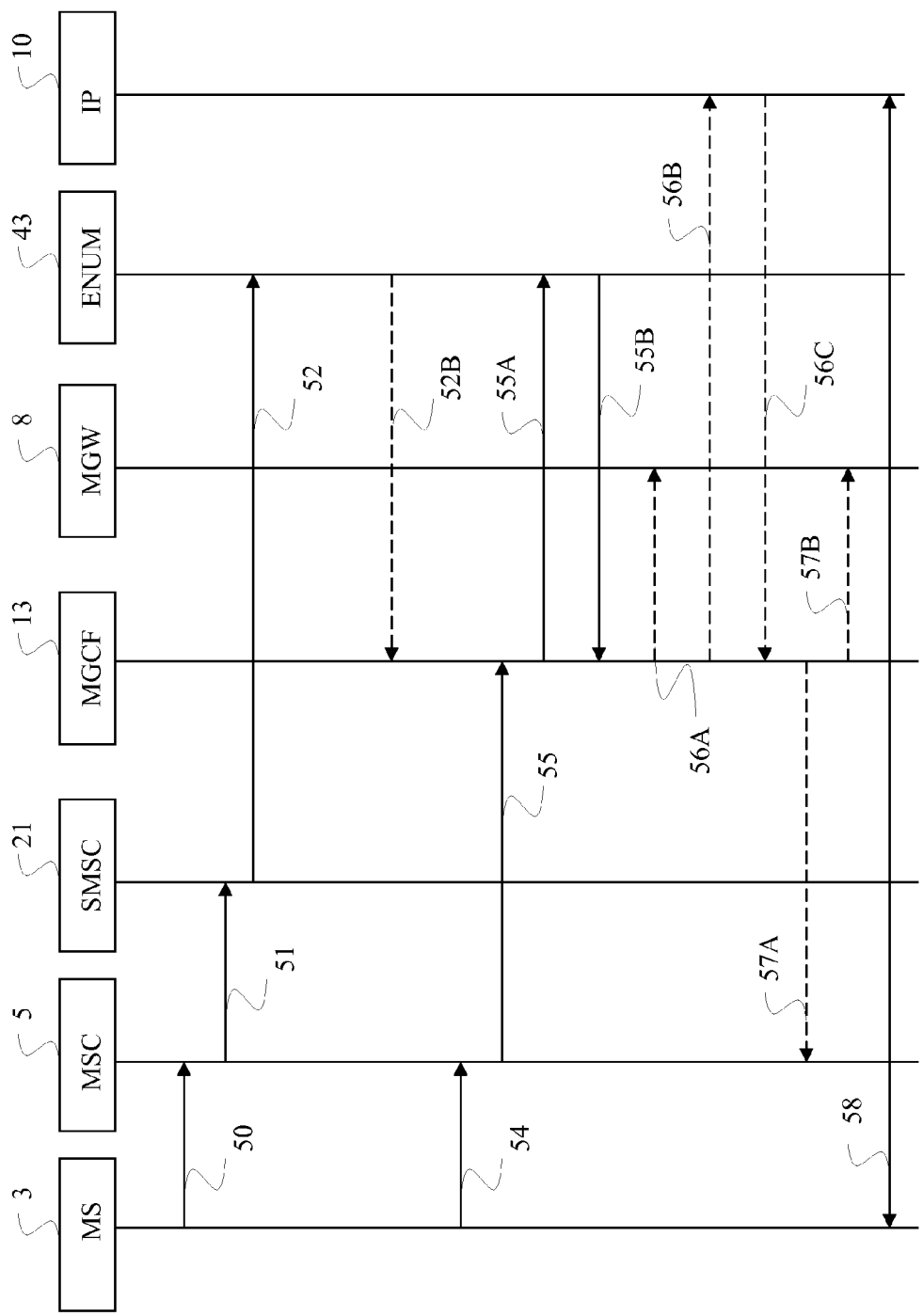
FIG. 5 is a state diagram of the second embodiment of the presented solution.

FIG. 5 illustrates schematically the solution implemented as the second embodiment of the invention with a state diagram, associated with the configuration of the network entities as depicted at FIG. 4.

Differences with the method of the first embodiment depicted at FIG. 3 are presented extensively, the parts of the method identical with the first embodiment described at FIG. 3 are presented in a concise way.

MS 3 transmits 50, as a first step of the call method, a message comprising the SIP-URI e.g. sip: userABC@hostKLM.domainXYZ of a party to be called as a message e.g. a SMS, as to call the party at the IP network 2 at its IP terminal 10.

The address used by MS 3 as destination for the message is a GWSNr, preferably previously configured at an address book of MS 3.

The MSC 5 receives 50 the message via radio link 4 and the message contents is forwarded 51 via link 20 towards the SMSC 21. Along with the SMS the CgPN of the MS 3 is sent as well by MSC 5 towards the SMSC 21. SMSC 21 is arranged to recognise that the message received is an attempt of MS 3 to a call setup to the party to be called associated with the SIP-URI as comprised by the message.

In this second embodiment the storage of the message comprising the CgPN identifier and the SIP-URI identifier is performed by the database 42 of the adapted ENUM server 43.

The SMSC 21 forwards 52, the message comprising the CgPN identifier of MS 3 and the SIP-URI identifier, from the MSC 5 towards the adapted ENUM server 43 via link 40. The adapted ENUM server 43 is arranged to store the message in its database 42. The database 42 is positioned optionally, attached, internal to the adapted ENUM server 43 or located elsewhere at a distinct entity or function within a telecommunication platform.

After receiving 52 the message comprising the CgPN identifier of the MS 3 and the SIP-URI identifier of the party to be called at the IP terminal 10, the adapted ENUM server 43 stores the message in its database 42.

This stored message comprises both the CgPN and the SIP-URI identifiers associated such that when a subsequent query to the database 42 provides a specific CgPN, the database 42 selects the stored message having the corresponding specific GgPN and provides the associated SIP-URI of the selected stored message.

As a second step of the call setup method, the MS 3 initializes 54 a call setup towards the GWSNr.

Note that different from the first embodiment, the GWSNr address in this second embodiment is to be understood as the adapted ENUM server 43 address for messages, and the MGCF 13 address for calls.

The MSC 5 analyses the CdPN GWSNr as provided by the received 54 call setup request by MS 3. The CdPN E.164 format address is internationalized. Routing analysis will in this case determine that the CdPN GWSNr address belongs to MGCF 13. An IAM request comprising the CgPN of MS 3 and the CdPN GWSNr, both in E.164 address format is sent 55 by MSC 5 via signaling link 6 to MGCF 13.

The MGCF 13 is arranged such that when a call setup request signaling triggered by MS 3 is received 55, this call setup request is regarded as a request that the MS 3 requests to call a party at the IP network 2, the party being represented by the SIP-URI comprised by the message sent by the same MS 3.

On receiving 55 of the call signaling, MGCF 13 initiates 55A a query to adapted ENUM server 43 for the SIP-URI comprised by the stored message comprising the CgPN, corresponding to the CgPN received 55 at the call signaling.

The adapted ENUM server 43 selects at its database 42 the stored message associated with CgPN and provides 55B as a result of the query the SIP-URI of the party to be called from this selected stored message.

On reception 55 of the call signaling sent by MSC 5 comprising the CgPN of MS 3, the MGCF 13 reserves 56A via control link 11 a channel in the MGW 8 for handling a media connection between GSM PLMN 1 and IP network 2 via media links 7 and 9.

The MGCF 13 also resolves in cooperation with IP domain entities (not shown) the SIP-URI into an IP address and subsequently a SIP-INVITE message is sent 56B to IP terminal 10.

On a SIP OK 200 reply message 56C, representing a positive acknowledgement for receiving a connection, from the IP terminal 10 towards MGCF 13, the MGCF 13 sends an ISUP ANM 57A to the MSC 5 via signaling link 6, and the MGCF 13 as well instructs 57B MGW 8 to convert and forward any incoming data to the other side of media links 7 and 9, using the previously reserved 56A channel. The MSC 5 switches the MS 3 to the MGW 8 via media link 7 whereby the call 58 is established.

At the method as presented, the MGCF 13 only starts the preparations 56A, 56B for a call setup at the IP network 2, after it has received 55 the call signaling. As to speed up a call setup these preparation steps 56A and 56B are alternatively performed already as the adapted ENUM server 43 received 52 the message from the SMSC 21 and signaled 52B via link 41 the MGCF 13 that a call setup request 54, 55 for a MS 3 having a CgPN address is to be expected.

According to this second embodiment the MS 3 transmits 50 the SIP-URI as a text string in an SMS message to the SMSC 21, and initializes 54 a subsequent call setup request signaling to a predefined GWSNr the call setup process.

Deploying the solution in this way, as described by this second embodiment would not require any adaptation to the MS 3, and hence any state of the art CS terminal 3 with SMS capability would be able to cooperate with this second embodiment of the solution without any modification.

It is however regarded as useful to adapt the MS to an even more convenient device, according to the explanation at FIG. 3 above where the MS 3 is equipped with an OS that is arranged to analyse the users selection at the address book or keyed string for a SIP-URI and as described at FIG. 3, a process for transmitting 50 a SMS to the SMSC 21 followed by a initializing 54 a call setup request to the GWSNr if a user attempts to call a party by means of a SIP-URI.

A further feature, labeled here as "undetermined sequence" feature, is that a specific sequence of transmitting 50 the message and initialize 54 the call setup request is not necessarily determined. It could occur that when a call setup request signaling originated by MS 3 at the initializing action 54 is received 55 at the MGCF 13, the message, originated by MS 3 at the transmitting action 50, has not yet been received 52 by adapted ENUM server 43 Hence a query to the database 42 does not yield any stored association for the CgPN of MS 3. If a telecommunication network operator enables this "undetermined sequence" feature, one or more attempts are scheduled, until a predetermined number of attempts. In case the message from MS 3 is received 55 at MGCF 13 and its contents is subsequently stored as described above in database 42, a subsequent query would yield a SIP-URI and the call setup method towards IP terminal 10 continues.

A further feature to be optionally implemented at the MS 3 is to arrange the OS of the MS 3 such that when the SIP-URI is transmitted 50 via radio link 4 to MSC 5 towards SMSC 21, that the OS after a predetermined period after transmitting 50 the SMS with the SIP-URI, initializes 54 a call setup request to the predefined GWSNr without user intervention. The predetermined period is adjustable between a few milliseconds until 30 seconds, a value depending on network and terminal performance should be chosen. As a starting value 2 seconds is suggested. In this way a call setup is advantageously performed by the user only having to initialize a message.

In case the telecommunication network operator enabled the "undetermined sequence" feature as described above, there is no need to wait for a period between transmitting 50 the message and initializing 54 the call setup request.

Figure 6:
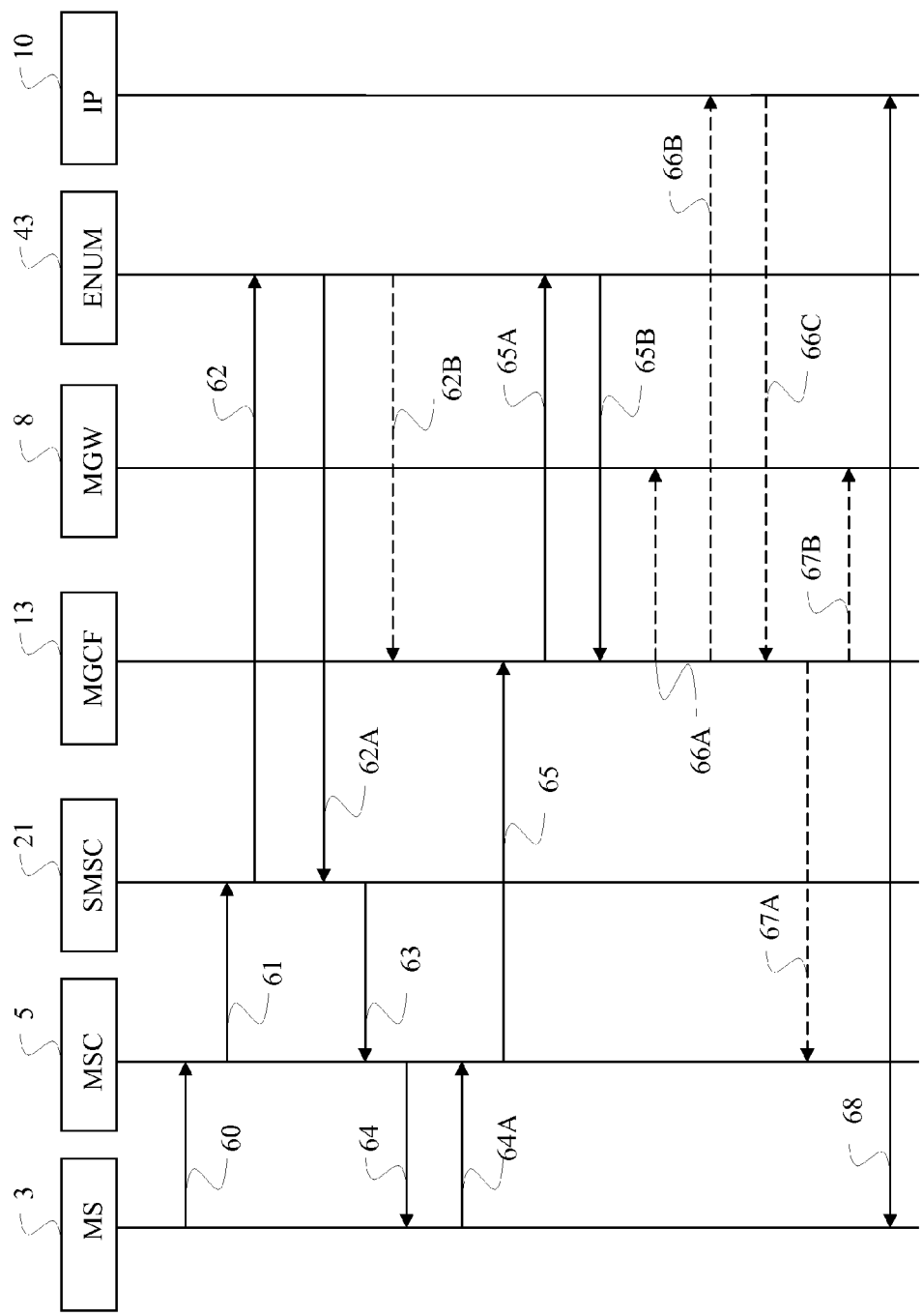
FIG. 6 is a state diagram of the third embodiment of the presented solution.

Associations of CgPNs and SIP-URIs of parties to be called are retained for a certain period at the database 42 as to efficiently maintain storage facilities FIG. 6 illustrates schematically the solution implemented as a third embodiment of the invention with a state diagram, associated with the configuration of the network entities as depicted at FIG. 4.

Differences with the method of the second embodiment depicted at FIG. 5 are presented extensively, the parts of the method identical with the second embodiment described at FIG. 5 are presented in a concise way.

Steps 60, 61, 62, 62B, 65, 65A, 65B, 66A, 66B, 66C, 67A, 67B and 68 are identical to steps 50, 51, 52, 52B, 55, 55A, 55B, 56A, 56B, 56C, 57A, 57B and 58 respectively presented at the description of FIG. 5.

At this third embodiment the adapted ENUM server 43, initializes 62A, after receiving 62 a message comprising the CgPN, associated with the MS 3, and the SIP-URI associated with the party to be called from SMSC 21, a transmission of an identifier representing a service number such as a GWSNr service number, towards the SMSC 21 via link 40.

The identifier is preferably in a Telephone (TEL)-URI format or a text string comprising E.164 format number.

This GWSNr service number is either a predetermined number available from a dedicated stored number within the adapted ENUM server 43, or a number selected from a pool of service numbers.

This GWSNr service number is packed by the adapted ENUM server 43 into a format to be transported by SMPP, UCP or MAP protocols, and transmitted 62A towards the SMSC 21 via link 40 for delivery 63 to MSC 5 and forwarded 64 to MS 3 as an SMS message.

In case a pool of service numbers is deployed, an additional functionally is provided in that a specific MGCF 13 and its MGW 8, is to be addressed at a second step of the call setup process. This additional functionality does not require that the MS 3 needs to maintain a GWSNr locally or to be known to the user of MS 3.

Typical implementations of the MS 3 enable MS 3 to call the GWSNr address comprised by the received 64 SMS message.

Again as in the embodiments presented previously, the MS 3 is able to apply the solution without any adaptation as each action of sending a message 60, receiving a message 64 and setting up a call 64A are enabled by standardized capabilities of MS 3.

As an option at this third embodiment, adapted ENUM server 43 provides the GWSNr via a direct link (not shown) between the server 43 and the MSC 5 by means of an Intelligent Network Application Protocol (INAP) message. The MSC 5 subsequently provides the GWSNr to the MS 3 thereby enabling MS 3 to select the provided GWSNr to setup a call as the second step of the call setup process.

Application of the "undetermined sequence" feature as explained at the first and second embodiments is applicable at this third embodiment.

Optionally as an even more convenient device, the OS of the MS 3 is arranged such that on transmitting 60 the message, a local timer at the MS 3 is initialized, and when the SMS message comprising the E.164 GWSNt address is received 64 within a predetermined period, the received E.164 number is applied 64A as an address to perform the second step of the call setup towards the terminal 10.

If the period as described at the last sentence is timed out, the MS 3 is according to a setting within the MS 3, arranged to call a predetermined GWSNr or just signal in an appropriate way to the user of MS 3 that the call has failed.

For all embodiments described above it is regarded as feasible that the solution is also applied in fixed CS telecommunication networks such as PSTN and ISDN, as long as a message functionality is available at terminal 3 and the appropriate messaging entity 21 and further required messaging infrastructure at the network 1 is available.

As described above, the solution is enabling for mobile terminals 3 without any adaptation. As appropriate terminals 3 to be used at the solution are appropriate, e.g. GSM mobile phones, UMTS User Equipment and combinational User Equipment.

The invention is described with embodiments that deploy SIP-URI's as address identifiers of the party to be called, by means of transmitting 30, 50, 60 a message where this SIP-URI is literally present. However as the solution enables any string to be used, any addressing format is executable as long the network gateway control entity, MGCF 13, is able to find a gateway to the network addressed by a particular address.

Examples of address formats and their use:
1) sip:UserABC@hostKLM.domainXYZ
   A session initiation protocol in an IP terminal 10
2) sip:UserABC@hostKLM.domainXYZ?Subject=xyz
   Idem as 1), but with additional information to be provided to the called IP terminal.
3) tel:+316512001065
   A telephone E.164 number for use in PSTN, ISDN or PLMN networks
4) ip4:169.150.150.150
   IP address for an IP version 4 network
5) eth:aa:bb:cc:00:aa:bb
   Ethernet address for use in an Ethernet network
6) url:hostABC.domainXYZ
   Universal address for a Host at the Internet At the examples above a short key: "sip", "tel" etc. provides an indication of the physical network entity that should be called or contacted to either submit the address identifier to for further address resolving. The skilled person is expected to perform the solution for the indicated networks by having the MSC 5 routing the call to the appropriate MGCF 13 and MGW 8 for performing the call setup to the other network.

The inventive solution advantageously also supports using a SIP-URI, where further information regarding the call setup is sent to called party, for instance a subject of the call setup.

In this case the message, sent as a SIP-URI, is supplemented with the subject additionally entered at the keyboard of MS 3 or preprogrammed at the address book of the MS 3.

Although the invention is explained for a call setup from a GSM PLMN 1, being a CS network, towards a IP network 2, the invention is also applicable for a call setup to a another CS terminal.

In case a call is setup by the method of the solution to a "tel" address format number, representing e.g. a PSTN number, the MGCF 13 sets up a call to the PSTN network, wherein the MGCF 13 simulates an IP-terminal requiring to call a CS type terminal having the "tel" address. In this case MS 3 is communicatively connected to the MGW 8 as shown at the embodiments above. The called CS terminal also communicatively connects to the MGW 8 and the MGCF 13 instructs the MGW 8 to connect both terminals.

In case network addresses are provided such as "ip4", "eth" or "url" representing the address of a device, representing an apparatus, host, server or other network entity, in said network, the MGCF 13 does not have to resolve the address but only needs to signal the addressed device by means of an appropriate protocol, that a connection is requested. On a positive acknowledgement from said device the MGW 8 communicatively connected to the particular PS network is instructed by the MGCF 13 to connect the call from the MS 3 towards the addressed device. When the routing path is established, the MGW 8 performs translation and adaptation of the communication protocol and data transferred by methods known in the art.

In case of a heavy load or malfunctioning of the message entity 21 or its links 20, 22, or 40, the message 32, 52, 62 might arrive later at the MGCF 13 or adapted ENUM server 43, then the call setup request signaling 34, 55, 65 of the second step, although actually sent earlier. In this case the MGCF 13, that receives 34, 55, 65 the call setup request signaling triggered by MS 3, does not receive a matching CgPN in its query to the database 13A, 42. The MGCF 13 comprises a timer function which starts a certain time period, preferably adjustable by a telecommunication network operator in a pragmatic range of e.g. 2 to 30 seconds, wherein after a timeout a second or further attempt is made to find the matching CgPN. If there is no match after a second or predetermined number of further attempts, there are no further attempts and the user at MS 3 is signaled that the call failed.

In case the address of the SIP-URI is not resolved for some reason or the called IP terminal 10 does not accept the call setup, the user at MS 3 is signaled that the call has failed.

Figure 7:
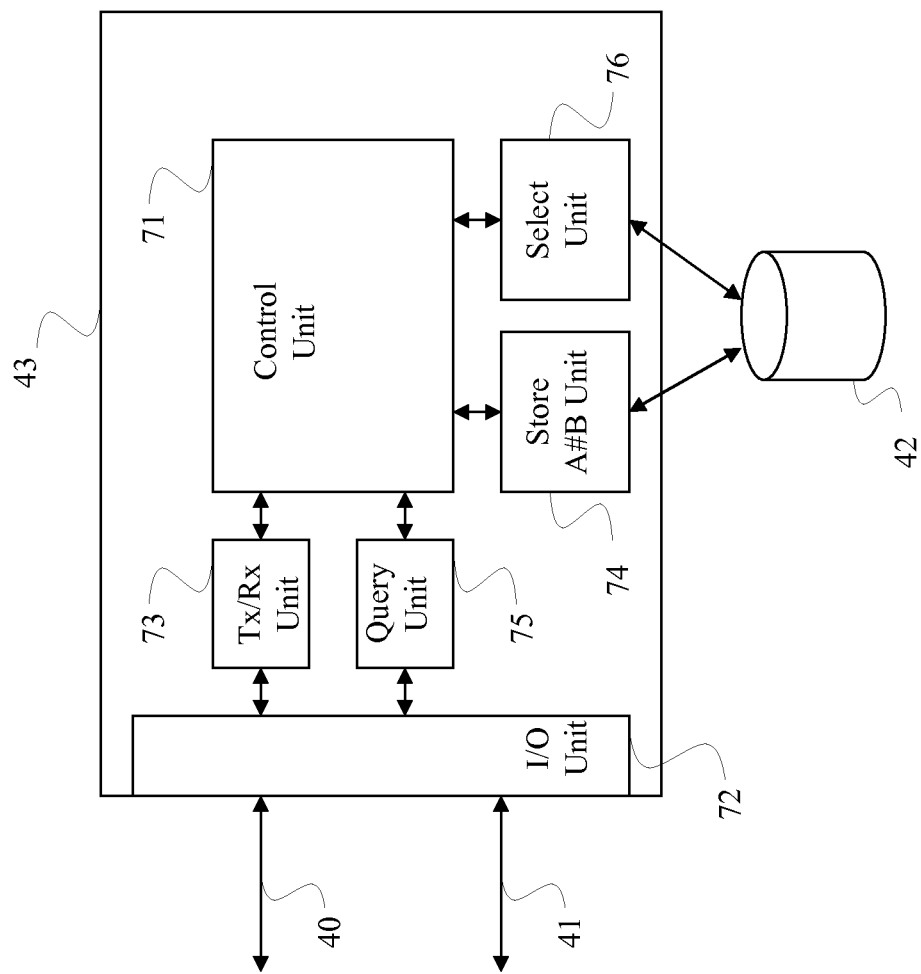
FIG. 7 is a schematic diagram of a network address mapping entity applied at the solution presented.

FIG. 7 illustrates schematically the network address mapping entity such as the adapted ENUM server 43 as implementation of the solution as depicted at the second and third embodiments.

The adapted ENUM server 43 comprises a control unit 71 communicatively connected to a Transceive/Transmit (Tx/Rx) unit 73, a store unit 74, a query unit 75 and a select unit 76. The transceive/transmit unit 73 and the query unit 75 are communicatively connected to an Input Output (I/O) unit 72 connectable to network links 40, 41.

The store unit 74 and select unit 76 are communicatively connected to database 42.

The control unit 71 is arranged to have supervisory control over the units 72-76 as to perform the steps as presented by the solution.

All units 71-76 of adapted ENUM server 43 are implemented either in hardware or in software or in a combination of hardware and software.

Below is explained how the units of adapted ENUM server cooperate according to an example of the solution:

The I/O unit 72 receives via link 40 a message triggered by MS 3 for a call setup, comprising a CgPN of MS 3 and a SIP-URI of a party to be called and signals the transceive/transmit unit 73.

Transceive/Transmit unit 73 retrieves the messages from the I/O unit 72 and performs a check on the message contents on e.g. format requirements and signals the control unit that the message is ready to be stored.

The control unit 71 transfers the message to the Store unit 74 that stores the message into database 42 where the message, comprising an association between the CgPN of the calling party (A-party) and the SIP-URI of the called party (B-party), is stored.

The I/O unit 72 receives via link 41 a query request with a specific given CgPN, requesting for an associated SIP-URI, and signals query unit 75.

Query unit 75 retrieves the query request from the I/O unit 72 and performs a check on the query request contents on e.g. format requirements and signals the control unit 71 that the query is ready to be processed.

The control unit 71 transfers the query request to the Select unit 76 that is arranged to select a stored message from database 42 that comprises the CgPN corresponding to the specific given CgPN of the query request.

The select unit 76 retrieves the SIP-URI from the selected message and signals the control unit 71 that a query result is available. This SIP-URI represents the SIP-URI of the party to be called by MS 3, represented by the CgPN.

The control unit 71 transfers the SIP-URI query result from the select unit 76 towards the query unit 75, that forwards this result via I/O unit 72 to network link 41.

The stored message with associated CgPN and SIP-URI identifiers is maintained at the database 42 for predetermined period. After a time out of this predetermined period, or after a successful query the stored message is deleted.

At the third embodiment the transceive/transmit unit 73, in cooperation with control unit 71 and I/O unit 72 is further applied to transfer the GWSNr into the direction of the MS 3 at step 62A, via link 40 or via a direct network link towards the MSC 5 (not shown).

Figure 8:
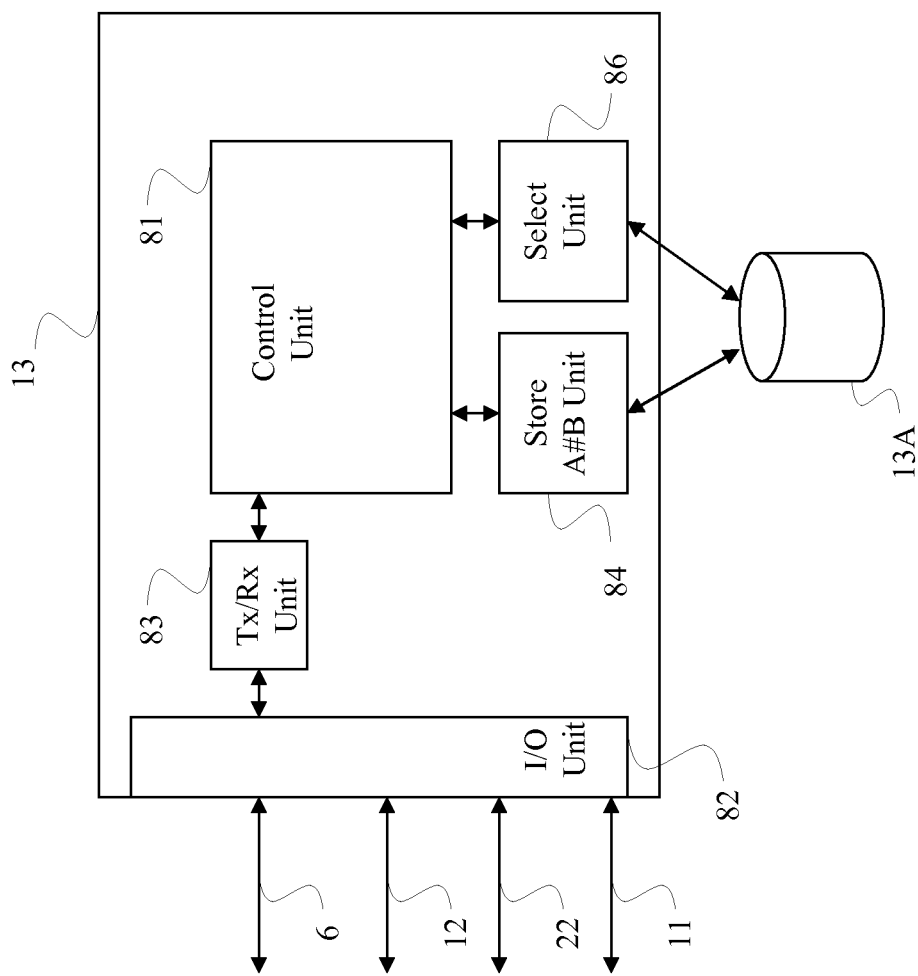
FIG. 8 is a schematic diagram of a network gateway control entity of embodiments of the presented solution.

FIG. 8 illustrates schematically the network gateway entity such as MGCF 13 as implementation of the solution as depicted at the first embodiment.

The MGCF 13 comprises a control unit 81 communicatively connected to a Transceive/Transmit (Tx/Rx) unit 83, a store unit 84, a query unit 85 and a select unit 86. The transceive/transmit unit 83 and the query unit 85 are communicatively connected to an Input Output (I/O) unit 82 connectable to network links 6, 12, 22, 11.

The store unit 84 and select unit 86 are communicatively connected to database 13A.

The control unit 81 is arranged to have supervisory control over the units 82-86 as to perform the steps as presented by the solution.

All units 81-86 of MGCF 13 are implemented either in hardware or in software or in a combination of hardware and software.

Below is explained how the units of MGCF 13 cooperate according to an example of the solution:

The I/O unit 82 receives via link 22 a message triggered by MS 3 for a call setup, comprising a CgPN of MS 3 and a SIP-URI of a party to be called and signals the transceive/transmit unit 83.

The transceive/transmit unit 83 retrieves the messages from the I/O unit 82 and performs a check on the message contents on e.g. format requirements and signals the control unit that the message is ready to be stored.

The control unit 81 transfers the message to the Store unit 84 that stores the message into database 13A where the message, comprising an association between the CgPN of the calling party (A-party) and the SIP-URI of the called party (B-party), is stored.

The I/O unit 82 receives via network link 6 a call set up request triggered by MS 3, comprising the CgPN of MS 3 and signals the transceive/transmit unit 83.

The transceive/transmit unit 83 retrieves the call setup request from the I/O unit 82 and performs a check on the call setup request contents on e.g. format requirements and signals the control unit that the call setup request is ready to be processed.

The control unit 81 signals the select unit 86 that is arranged to select the stored message from the database 13A that comprises the CgPN corresponding to the specific CgPN of the call setup request.

The select unit 86 retrieves the SIP-URI from the selected message and signals the control unit 81 that a result is available. This SIP-URI represents the SIP-URI of the party to be called by MS 3, represented by the CgPN.

The control unit 81 forwards the SIP-URI result from the select unit 86 via I/O unit 82 to network link 12.

The stored message with associated CgPN and SIP-URI identifiers is maintained at the database 13A for predetermined period. After a time out of this predetermined period, or after a successful select action the stored message is deleted.

The MGCF 13 deployed at the second and third embodiments has the process of storing and selecting the stored message with the CgPN of the calling party and the SIP-URI of the called party, performed by means of a query to a network address mapping node. This query is initialized by a query request comprising the CgPN of the calling party, and as a result the SIP-URI of the called part is expected.

Figure 9:
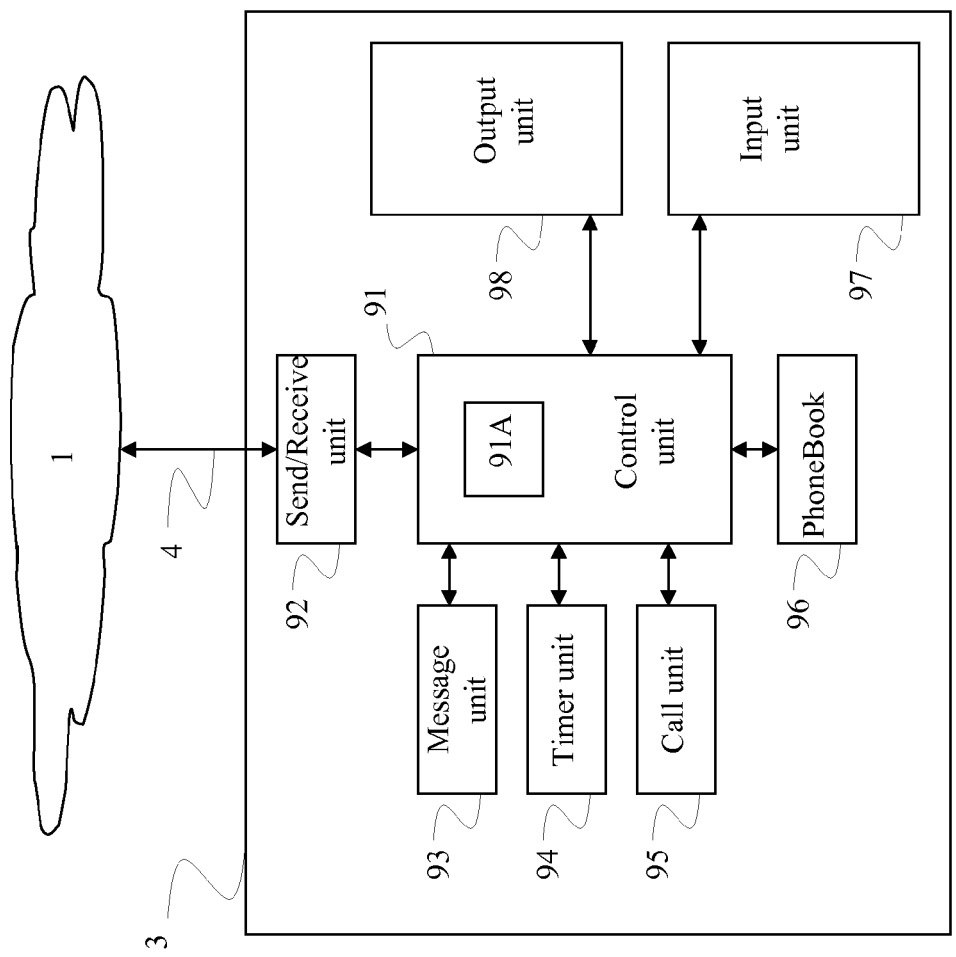
FIG. 9 is a schematic diagram of a Circuit Switched network type terminal deployed at the embodiments of the presented solution.

FIG. 9 illustrates schematically an adapted CS network type terminal 3 such as a GSM terminal MS 3 as deployed at the embodiments as presented above.

The MS 3 as described at the embodiments has a control unit 91 for having executing its Operating System (OS) 91A, the control unit 91 communicatively connected to an input unit 97 such as one or more of a keyboard device, a pointer device, a microphone or a touch screen; an output device 98 such as one or more of a video display screen, an audio speaker, a buzzer, Light Emitting Diode arrays; a call unit 95; a timer unit 94; a message unit 93; a phonebook 96 and a send & receive radio transmission unit 92. The send & receive unit 92 is communicatively connected to the CS network 1 via a network radio link 4, communicatively connected to radio base stations residing within the CS telecommunication network 1. The Control Unit 91 has supervisory control over units 92-98. Units 91-98 are implemented in either software or hardware or a combination of both.

The adapted MS 3 is arranged such that the SIP-URI of the party to be called is selected from a local phonebook 96 of the MS 3 where the OS 91A of the MS 3 is arranged to cooperate with the solution as stated below.

The address book of MS 3 is filled with sequences comprising either: "person X [name]" followed by e.g. "+31651200168" as a phone number or SIP-URIs "sip: userABC@hostKLM.domainXYZ" or both.

Additionally a function key of input unit 97 of the MS 3 enables the keying in of a string of characters including signs and "@", such that when the "Enter" key [or "Yes" or any other key representing off-hook or "send"] is pressed as to intialize a call setup request, the keyed-in string of characters, is considered as a destination address.

A selection of an E.164 CS network type phone number from the address book 96 or a keyed in string, is handled in the usual way in that a call setup request is initialized by call unit 95, but if a SIP-URI is selected from the phone book or keyed in as a string of characters, the OS 91A activates message unit 93 as to initialize the transmission of an SMS message comprising the SIP-URI to a predetermined GWSNr stored in local memory of MS 3

The adapted MS has an OS 91A that is arranged such that on transmitting 30, 50, 60 the SMS message, a timer unit 94 is initialized for a predetermined value by control unit 91, and when the timer unit 94 times out the control unit 91 initializes call unit 95 to set up a call setup to a predetermined GWSNr stored locally at the MS 3. Application of this feature at the third embodiment would either have the MS 3 call the GWSNr provided 64 by the adapted ENUM server 43 or the preprogrammed GWSNr, depending on timing parameter settings which call setup is made on first served basis.

The description above is based on deployment of an SMS as message system. The skilled person is regarded to be able to implement other message systems such as e.g. e-mail or Instant Messaging (IM) with their specific network entities, links and protocols for performing the analogue functionality provided by the SMS and SMSC 21.

The solution as presented solves the problem of preventing the requirement of maintaining two types of addresses for the same IP terminal 10 in an IP network 2 as implementation of a PS network 2 that needs to be called by a party using a CS network type terminal 3 residing at the CS network 1.

An advantage of the solution is that only minor adaptations to existing network entities such as the MGCF 13, SMSC 21 or adapted ENUM server 43 are required to perform the solution. Links 22 or 40 are proposed to be deployed with existing protocols as indicated above.

A further advantage of the solution is that a call setup to devices in other network types than IP networks 2 and even to terminals residing in a CS network 1 are enabled as long as a party to be called deploys an addressable device in a network where the MGW 8 is communicatively connected to.

A still further advantage of the solution is that state of the art terminals benefit from the application of the solution without any adaptation to the terminal.

More sophisticated terminals with a programmable or downloadable operating system and according to the terminal adaptations suggested above, are even capable of executing the second step of the call setup process thereby providing the user of the terminal a look and feel of a call setup to a terminal in a traditional CS type network although an IP type terminal is called.

The solution as presented is explained in a PLMN environment. The solution is however also applicable in fixed networks such as the PSTN or ISDN in case the network and its terminals are adapted to compose and select messages comprising the called party's address as an URI.

The solution as disclosed provides a simple and reliable alternative for a call setup by a CS type terminal 3 towards a PS type terminal 10, wherein only minor adaptations to existing network entities are required to enable a call setup and where PS type terminals 10 are not associated with an E.164 number.

The invention claimed is:
1. A method for performing a call setup from a first terminal residing in a Circuit Switched telecommunication network to a second terminal residing in a Packet Switched telecommunication network, the Circuit Switched network and the

Packet switched network being communicatively connected to each other, the method comprising the steps of:

receiving a message, the message being triggered by the first terminal, and comprising an address of the first terminal and an address of a party to be called at the second terminal;

storing the message in a database;

receiving a call setup request, the call setup request being triggered by the first terminal after having triggered the message;

selecting from the database the stored message comprising the address of the first terminal, which address corresponds to the address comprised by the call setup request;

retrieving the address of the party to be called from the selected stored message, and resolving the address of the party to be called into an address of the second terminal;

setting up the call between the first terminal and the second terminal identified by the resolved address of the second terminal, and connecting the call.

2. The method according to claim 1 wherein the step of receiving a message and the step of receiving a call setup request are performed by a network gateway control entity.

3. The method according to claim 1 wherein the step of receiving a message is performed by a network address mapping entity and the step of receiving a call setup request is performed by a network gateway control entity, the network address mapping entity and the network gateway control entity being communicatively connected, and where the network gateway control entity queries the address mapping entity for the address of the party to be called.

4. The method according to claim 3 wherein the storing step further comprises selecting a predetermined address belonging to the Circuit Switched telecommunication network and where said address is provided to the first terminal and deployed at the receiving a call setup request step.

5. The method according to claim 1, wherein is the steps performed by the network gateway control entity are performed by a Media Gate way Control Function entity controlling a Media Gate Way entity communicatively connecting the Circuit Switched telecommunication network and the Packet Switched telecommunication network.

6. The method according to claim 1, wherein the retrieving step for the address of the party to be called is performed by the network gateway control entity for a second or subsequent time after a predetermined period when a first retrieving step was not successful in providing said address.

7. The method according to claim 1, wherein the address of the first terminal at the receiving steps and the retrieving step is a Calling Line Identification, CLI, or Calling Party Number, CgPN, and the address of the party to be called at the IP terminal is a Session Initiation Protocol—Universal Resource Indicator, SIP-URI.

8. The method according to claim 1, wherein the message sent by the first terminal is a Short Message Service, SMS message.

9. A network gateway control entity arranged for cooperating in performing a call setup request by first terminal residing in a Circuit Switched telecommunication network to a party to be called at a second terminal residing in a Packet Switched telecommunication network, the first terminal having a first address identifier and the party to be called having a second address identifier, the gateway control entity arranged for controlling a gateway entity that communicatively connects the Circuit Switched telecommunication network and the Packet Switched telecommunication network, the gateway control entity comprising a control unit and an input/output unit connectable to network links, the input/output unit arranged to receive a call setup request comprising a first address identifier, the control unit is further arranged to initialize a query for the second address identifier-to a database comprising a stored message, the stored messages comprising the first address identifier and the second address identifier, the stored message triggered by the first terminal prior to the call setup request, the control unit initializing the query with the first address identifier received at the call setup request.

10. The network gateway control entity according to claim 9 wherein the entity further comprises a store unit and a select unit, the store unit and the select unit connectable to the database, the control unit further communicatively connected to the store unit and the select unit, the control unit further supervisory controlling the units, the input/output unit further arranged to receive a message, the message comprising the first address identifier and the second address identifier, the store unit arranged to store the message comprising an association between the first address identifier of the first terminal and the second address identifier of the party to be called at the second terminal, the select unit arranged to select the stored message that comprises the first address identifier corresponding to a provided input variable, the select unit further arranged to retrieve the second address identifier comprised by the selected message, the control unit further arranged to initialize the query by providing the select unit with the specific first address identifier of the call setup request as the input variable, the retrieved second address identifier being the result of the query.

11. The network gateway control entity according to claim 9 wherein the first address identifier is a Calling Party Number, CgPN, identifier or Calling Line Identifier, CLI, and the second address identifier is Session Initiation Protocol Universal Resource Identifier, SIP-URI.

* * * * *